UNITED STATES PATENT OFFICE.

ARCHIBALD H. KERR, OF MIDWAY, TEXAS, ASSIGNOR OF ONE-HALF OF HIS RIGHT TO WILLIAM HENRY KITTRELL, OF SAME PLACE.

COMPOSITION FOR WHITEWASH.

SPECIFICATION forming part of Letters Patent No. 226,758, dated April 20, 1880.

Application filed December 23, 1879.

*To all whom it may concern:*

Be it known that I, ARCHIBALD H. KERR, of Midway, in the county of Madison and State of Texas, have invented a new and Improved Composition for Whitewash; and I do hereby declare that the following is a full, clear, and exact description of the same.

My invention relates to a novel composition for whitewashing houses, walls, fences, outbuildings, &c., designed for great smoothness, brilliancy, and durability; and it consists in a compound of lime, whiting, plaster-of-paris, glue, carbonate of soda, biborate of soda or borax, and sulphate of soda, prepared in the manner and proportions hereinafter described.

In carrying out my invention I take of lime, one-half bushel; whiting, one peck; plaster-of-paris, two quarts; glue, four pounds; carbonate of soda, two pounds; borax, one pound; sulphate of soda, two pounds.

Of these ingredients I first slake the lime in a close covered barrel with about six gallons of hot water. All the other ingredients are then separately dissolved or stirred up in hot water—the whiting in about two gallons of water, the plaster-of-paris in about one-half gallon of water, the glue in about two gallons, the carbonate and sulphate of soda in about one-half gallon each, and the borax in about one-half gallon. These separate solutions or mixtures are then added to the lime in the following order: first, the whiting; second, the plaster-of-paris; third, the glue; fourth, the carbonate of soda; fifth, the borax; and, sixth, the sulphate of soda. The mixture is then thoroughly stirred, and if too thick its consistency is reduced by hot water to about that of cream or ordinary paint.

This composition is then ready for application, which should be done while hot and with any ordinary form of brush.

If it be desired to give any special tint or color to the wash, this may be done by adding any of the usual coloring-matters.

This composition I find to be very nearly, if not quite, equal to paint, as it possesses the same enduring properties, does not rub off, and does not break, peel, or lose its freshness. While it possesses these advantages, however, it exceeds but little the cost of the ordinary whitewash, since the latter requires two coats, while one only is necessary with my composition.

I have found also by experiment that my composition, when applied to wood-work, has a tendency to render it fire-proof.

Having thus described my invention, what I claim as new is—

A composition for whitewash consisting of lime, whiting, plaster-of-pairs, glue, carbonate of soda, borax, and sulphate of soda, compounded in the manner and in about the proportions described.

ARCHIBALD HENDERSON KERR.

Witnesses:
 E. K. GOVER,
 V. A. HENDRIX.